United States Patent [19]

Winter, III

[11] 3,907,921

[45] Sept. 23, 1975

[54] WATER INJECTION IN A DEHYDROGENATION PROCESS

[75] Inventor: George R. Winter, III, Des Plaines, Ill.

[73] Assignee: Universal Oil Products Company, Des Plaines, Ill.

[22] Filed: Apr. 25, 1974

[21] Appl. No.: 463,954

[52] U.S. Cl. ............ 260/683.3; 208/138; 252/420
[51] Int. Cl.² ........................................ C07C 5/18
[58] Field of Search...... 260/683.3, 669 R; 252/420; 208/138

[56] References Cited
UNITED STATES PATENTS

| | | | |
|---|---|---|---|
| 2,167,650 | 8/1939 | Grosse | 260/683.3 |
| 2,620,314 | 12/1952 | Hoekstra | 252/448 |
| 3,234,120 | 2/1966 | Capsuto | 208/138 |
| 3,391,218 | 7/1968 | Bloch et al. | 260/683.3 |
| 3,448,165 | 6/1969 | Bloch | 260/683.3 |
| 3,448,166 | 6/1969 | Bloch et al. | 260/683.3 |
| 3,487,121 | 12/1969 | Hallee | 260/683 R |
| 3,649,566 | 3/1972 | Hayes | 252/470 |
| 3,660,271 | 5/1972 | Keith | 208/138 |
| 3,720,602 | 3/1973 | Riley et al. | 208/216 |
| 3,766,289 | 10/1973 | Cohen et al. | 260/683.3 |

*Primary Examiner*—Veronica O'Keefe
*Attorney, Agent, or Firm*—James R. Hoatson, Jr.; Robert W. Erickson; William H. Page, II

[57] ABSTRACT

The activity of a used dehydrogenation catalyst is improved by an increase in the water concentration maintained in the reactants toward the end of the catalyst's life. Optimum operation results when the water concentration is increased gradually as the temperature of the reactor is increased. The process preferably utilizes a catalyst comprising a platinum component, a germanium component, and an alkali or alkaline earth component on an alumina carrier material.

12 Claims, No Drawings

WATER INJECTION IN A DEHYDROGENATION PROCESS

BACKGROUND OF THE INVENTION

1. Field of the Invention

The invention relates to a process for the catalytic dehydrogenation of hydrocarbons, including aromatic and normal paraffinic hydrocarbons. It is more specifically directed to a dehydrogenation process in which water is injected into the reactor along with the reactants. The invention particularly concerns the effect of gradually increasing the rate of water injection on the life and activity of a dehydrogenation catalyst.

2. Description of the Prior Art

Processes for the catalytic dehydrogenation of paraffinic hydrocarbons are well known in the art. Specific processes and catalysts for the dehydrogenation of paraffins are presented in U.S. Pat. Nos. 3,391,218 and 3,448,166 (Cl. 260-683.3). Other references indicating the diversity of such processes and catalysts are contained in U.S. Pat. Nos. 3,647,911 and 3,649,566.

U.S. Pat. No. 3,448,165 discusses effects of water addition on a catalyst for the dehydrogenation of normal paraffins which comprises arsenic attenuated platinum on lithiated alumina. The beneficial effect of increased water addition to a hydrodesulfurization process is described in U.S. Pat. No. 3,720,602.

BRIEF SUMMARY OF THE INVENTION

The invention is an improvement in a process for dehydrogenating hydrocarbons which provides increased catalyst life and increased conversions at specific temperatures during the catalyst life. These benefits are obtained by increasing the water concentration in the reactant stream above the initially optimum value as the catalyst becomes less active.

DETAILED DESCRIPTION

Processes for the production of olefinic hydrocarbons are very useful in the production of a great many petrochemical products. The longer chain normal paraffins having from 5 to 18 carbon atoms per molecule are often subjected to such treatment to form the corresponding olefin. These in turn are used, for example, in the alkylation of benzene to make sulfonated detergents. These long chain olefins may also be subjected to direct sulfation to form biodegradable alkylsulfates or may be hydrated to alcohols used to produce plasticizers. A great many other uses for such olefinic materials are known.

The preferred process used for the dehydrogenation of hydrocarbons is quite simple and straight forward. Fresh feed is combined with recycle hydrogen and recycled unconverted hydrocarbons. This forms a reactant stream which is passed through a bed of suitable catalyst maintained at the proper dehydrogenation conditions of temperature, pressure, etc., and the effluent of the catalyst bed is passed to a separation zone wherein the effluent is cooled and partially condensed. The uncondensed material is recycled as a recycle gas stream comprising hydrogen and light gases. The hydrogen produced in the process is vented off this stream for use in other applications such as desulfurization. The separation zone produces a liquid stream containing the dehydrogenated and undehydrogenated hydrocarbons which is passed into a stripping column to remove dissolved gases and cracked light ends. These procedures are all well known in the art. They present one mode in which a process embodying my invention may be practiced, but do not constitute a direct limitation on the inventive concept.

The liquid stream which has been treated in the stripping column is then separated to recover the dehydrogenated hydrocarbons. When normal paraffins are being processed, the olefins may be alkylated with benzene to produce detergent intermediates such as linear alkylbenzene. The practice in this situation is to pass the liquid stream from the stripping column directly into the detergent alkylation process. The olefins are alkylated and the higher boiling linear alkylbenzene is separated by fractionation. When the olefins are to be used to produce alkylsulfates, separation by fractionation is not feasible and a selective olefin recovery process is used.

It is known in the art that it may be desirable to include water in the reactant stream fed to the catalyst bed of some dehydrogenation processes. For example, U.S. Pat. No. 3,391,218 gives an example wherein 2000 ppm. of water is included in the reactant stream fed to a bed of arsenic attenuated platinum carried on lithiated alumina. A detailed analysis of the effect of water addition on a similar catalyst formulation is described in U.S. Pat. No. 3,448,165. There was also added 100 ppm. of sulfur during all the water addition test runs in this reference, and this may make this data different from that which would be obtained if only the water addition rate was varied from the initial test run. This second reference indicates an increase in selectivity results from the increased water content. It also states that "catalyst stability has been significantly improved as shown by a comparison of the conversions in columns A and C." This "stability" is not the same as the increased conversion of the present invention. The stability of the reference refers to the relative decrease in the rate of conversion during the time from time period A to time period C. Without water addition, the reference shows a decrease in conversion from 17.6% to 13.3% or to about 75% of the original value. With 3,000 ppm. of water (and 100 ppm. of sulfur), the reference shows a decrease in conversion from 14.7% to 12.6% or to about 86% of the first value. This is not the same as an increase in conversion following an increase in the water concentration. Indeed, the reference indicates that the isomerization activity of the reference catalyst is actually adversely affected by higher concentrations of water in the presence of sulfur. It is therefore an unexpected discovery that increasing the concentration of water can increase the rate of conversion obtained with used catalyst. It is also unreported that the optimum water concentration in the reactants, as far as conversion is concerned, is a direct function of the catalyst life. It is in these two discoveries that the present invention resides.

The dehydrogenation process of the present invention is preferably practiced with a catalyst which differs from that described in the above reference. The preferred catalyst is comprised of a platinum group component, a germanium component, and an alkali or alkaline earth metal supported on a porous carrier material. The preferred carrier material is a refractory inorganic oxide such as gamma-alumina. Specifically, the preferred dehydrogenation catalyst will contain on an elemental basis 0.01 to 2 wt.% platinum, 0.01 to 5 wt.% germanium and 0.1 to 5 wt.% of the alkali or alkaline earth metal. Preferably, there is present 0.05 to 2 wt.% germanium, 0.05 to 1 wt.% platinum and about 0.25 to 3.5 wt.% of the alkali or alkaline earth component. The preferred amount of the germanium component is ordinarily selected so that the atomic ratio of the germanium metal to the platinum group metal contained in the catalytic composite is about 0.2:1 to about 5:1. The amount of the alkali or alkaline earth component is preferably selected to produce an atomic ratio of the alkali or alkaline earth metal to the platinum group metal of about 10:1 to 25:1. The amounts of these materials should be chosen to provide a total metals content, which is defined to be the sum of the platinum group component, the germanium component, and the alkali or alkaline earth component calculated on an elemental metal basis, of from about 0.5 to about 5.5 wt.%. The alkali or alkaline earth component is selected from the group consisting of the alkali metals, cesium, rubidium, potassium, sodium and lithium, and the alkaline earth metals; calcium, strontium, barium and magnesium. This component is preferably lithium or potassium, which will most probably be present combined with another element such as oxygen. The platinum group component may be chosen from the group consisting of platinum, palladium, rhodium, ruthenium, osmium and iridium, but platinum is preferred.

In the manufacture of the preferred dehydrogenation catalyst, the germanium component may be added in any of the suitable methods known to the art. This includes coprecipitation or cogellation with the carrier material, ion-exchange with the carrier material or impregnation of the carrier material at any step in the preparation of the catalyst. One acceptable method involves coprecipitating the germanium component during the preparation of the carrier material, which is preferably an alumina. This is performed by admixing a soluble, decomposable germanium compound, such as germanium tetrachloride, with an aluminum hydrosol. The resulting mixture is combined with a suitable gelling agent and dropped into an oil bath maintained at elevated temperatures. This forms hydrogel spheres which are treated to specific aging and calcining treatments to form uniform crystalline gammaalumina spheres. Details of this sphere forming process are contained in U.S. Pat. No. 2,620,314. The platinum group component may also be incorporated in any of the suitable methods known in the art, such as coprecipitation or cogellation with the carrier material, ion-exchange with the carrier material or hydrogel, or impregnation either before or after the calcination of the carrier material, etc. The preferred method of preparing the catalyst involves the utilization of a soluble decomposable compound of the platinum group metal to impregnate the porous carrier material. For example, the platinum group metal may be added by wetting the carrier material with an aqueous solution of chloroplatinic acid. Typically, the carrier material is then calcinated. It is preferred to add the alkali or alkaline earth component to the carrier material after the platinum group and germanium components. Specifically, it is preferred to add the platinum group and germanium components to the carrier material, oxidize the resulting composite at a high temperature (i.e., about 800° to 1000°F.), treat the resulting oxidized composite with a mixture of air and steam in order to remove residual acidity, and then add the alkali or alkaline earth component. This addition step may be performed in any of the normal methods, including contacting the carrier material with a solution of a suitable decomposable compound of the desired alkali or alkaline earth metal. Suitable compounds include the halides, sulfates, nitrates and acetates of the alkali or alkaline earth component. Excellent results are obtained with an aqueous solution of lithium nitrate or potassium nitrate. The carrier material is then dried and calcined again. Further details on the composition and manufacture of the preferred catalyst may be obtained by referring to U.S. Pat. No. 3,647,719.

This detailed discussion of the preferred dehydrogenation catalyst is not intended to limit the scope of the present invention. The great difficulty of accurately predicting which catalytic materials are beneficially affected by increased water addition precludes a complete listing of those compositions to which the invention applies. It is envisioned that the invention could be applied to other catalysts, such as those containing rhenium or tin in addition to or in place of the germanium component of the preferred catalyst.

The effective life of the preferred dehydrogenation catalyst is inversely proportional to the rate of conversion at which the process is operated. For example, at 2% conversion, the catalyst shows only a minimal rate of deactivation. At 10% conversion, the commercially useful life of the catalyst drops to about 100 barrels of feed per pound of catalyst (BPP), and at about 12% conversion, the useful life drops to about 75 BPP. The activity of the catalyst decreases in gradual manner and the temperature of the reaction zone is gradually increased to compensate for this. Therefore the term "a preselected conversion per pass" used in this specification and the appended claims is intended to refer to a value selected to optimize operation of the process. This value may vary with the composition of the catalyst or the composition of the reactants. The value for any specific combination of feedstock, reactants and dehydrogenation conditions will also vary during a "run" of the process as the catalyst ages. That is to say, the preselected conversion per pass of the reactants through the catalyst bed may be 12 or 15 percent at the start of the run and 9 or 11 percent at the end of the run. The most important factors in determining this desired conversion per pass is the temperature required to maintain a given conversion as the catalyst ages. As this temperature rises, the rate of undesired side reactions will increase, and the selectivity of the process will suffer. The optimum conversion in the process may therefore be less than the maximum possible at any given catalyst life. Therefore, it is often desirable to operate the process to obtain a number of different preselected conversions as the catalyst ages and the temperature required to maintain the initial rate of conversion increases. The rate of water injection may be correlated with this temperature increase. These preselected conversions will normally decrease, with the second being less than the first, etc. until the run must be terminated.

Dehydrogenation processes and catalysts had previously been found to benefit from the presence of a small uniform amount of water or other diluent in the reactants. With the preferred catalyst, the injection of about 10 wt. ppm. of water (based on the hydrocarbon feed) into the feed stream maintained a water concentration in the reactants which seemed to optimize the activity and selectivity during the run. Increasing the rate of water injection into the fresh feed increases the concentration of water in the entire reactant stream which is passed into the reaction zone. It has now been discovered that increasing the injection rate to 50 wt. ppm. when the run of a commercial unit is 90% over extends the run an extra 20%. In terms of days on stream, an optimized unit runs about 20 days per catalyst loading. If the massive water injection is started on the eighteenth day, the run is extended to 24 days. In general, the process may be initially operated with an injection rate of from about 5 to about 25 wt. ppm. of water in the feed stream based on the hydrocarbons to be dehydrogenated. A step increase in the rate of water injection may occur at an earlier point in the run than indicated above, but should be after at least 40 wt.% of the hydrocarbons which may be dehydrogenated have passed through the reaction zone. At that point in time, the amount of water injected may be increased to reach a value of 25 to about 125 wt. ppm. of water in the hydrocarbon feed stream. This is an example of only one way in which the invention may be practiced.

This mode of the invention may be characterized as a process for the dehydrogenation of paraffinic hydrocarbons which comprises the steps of: (a) injecting 5 to 25 wt. ppm. of water, based on the fresh hydrocarbon feed rate, into a hydrocarbon feed stream comprising normal paraffins having 5 to 18 carbon atoms per molecule; (b) passing the hydrocarbon feed stream in admixture with a gaseous recycle stream through a reaction zone maintained at dehydrogenation conditions and containing a dehydrogenation catalyst comprising a platinum component and an alkali or alkaline earth component supported on a porous alumina carrier material; and, (c) increasing the rate of water injection into the fresh hydrocarbon feed stream to a value of 25 to 125 wt. ppm. after at least 40% of the normal paraffins which may be processed before the catalyst requires replacement have passed through the reaction zone.

It has already been pointed out that the effluent of a typical dehydrogenation reaction zone is cooled and partially condensed to separate out the dehydrogenated and undehydrogenated hydrocarbons. This produces a gaseous recycle stream which is returned to the reactor. This recycle stream will contain the lighter materials in the reactor effluent, such as hydrogen, water and light hydrocarbons. Water injected into the hydrocarbon feed stream therefore does not constitute the total amount of water which enters the reactor. The recycle gas actually contains more pounds per hour than the amount injected. This provides a second method of practicing the invention. In the preferred embodiment, the amount of water being charged to the reactor is controlled by varying the concentration of water in the recycle stream. This may be done by controlling the rate of water addition to various process streams or by controlling the rate of water loss from the process. Specifically, the preferred mode of operation with the previously described preferred catalyst comprises initially operating the dehydrogenation reaction zone at 470°C. with a water concentration in the recycle gas stream of about 4.5 milligrams per liter. When it is required to raise the temperature of the reaction zone to 475°C., the water concentration is increased to about 5.5 milligrams per liter. In a like manner, the water concentration in the gaseous recycle stream is increased to about 6.0 milligrams per liter at 480°C. and to about 6.5 milligrams per liter at 485°C. It is to be noted that the rate of water addition is not a straight function of temperature, but increases more sharply with the initial temperature increases. This method has been found to produce an average gain in production of over 10 percent compared to that obtained with constant water injection. The optimum concentration of water in the recycle stream will depend on the particular catalyst and feed stock being used in the process. It will also depend on the recycle gas rate as compared to the hydrocarbon rate. For example, only about one half the water concentration in the recycle gas is required at a 20 to 1 recycle gas rate as at a 10 to 1 rate. The water concentration in the gaseous recycle may initially range from about 3.5 to 5.5 milligrams per liter under the preferred operating conditions and increase to from 4.5 to 6.5 mg./lit. in the second temperature range, to 5.0 to 7.0 mg./lit. in the third temperature range, and to 5.5 to 7.5 mg./lit. in the fourth temperature range. These increases in the water concentration may be performed in a continuous preprogrammed method or in stepwise increments. The concentrations specified herein are intended to indicate the levels which are to be maintained and not the manner in which they are obtained.

The preferred embodiment of the invention may therefore be characterized in general as a process for the dehydrogenation of hydrocarbons which comprises the steps of: (a) mixing a hereinafter described gaseous recycle stream with a stream of hydrocarbons to be dehydrogenated to form a reactant stream comprising the hydrocarbons to be dehydrogenated and water, and passing the reactant stream through a reaction zone containing a dehydrogenation catalyst maintained at dehydrogenation conditions which include an initial temperature required to effect a first preselected conversion per pass through the reaction zone; (b) passing a reaction zone effluent stream comprising dehydrogenated and undehydrogenated hydrocarbons, water and hydrogen into a separation zone to effect the production of a gaseous recycle stream comprising hydrogen and from 3.5 to 5.5 milligrams of water per liter of the gaseous recycle stream; (c) increasing the concentration of water in the gaseous recycle stream to 4.5 to 6.5 milligrams per liter after the temperature required to maintain a second preselected conversion per pass in the reaction zone exceeds the initial temperature by 5°C.; and, (d) increasing the concentration of water in the gaseous recycle stream to 5.0 to 7.0 milligrams per liter after the temperature required to maintain a third preselected conversion per pass exceeds the initial temperature by 10°C. It is desired that the concentration of water in the gaseous recycle stream be further increased to 5.5 to 7.5 milligrams per liter when the temperature required to maintain a fourth preselected conversion per pass exceeds the temperature by 15°C.

As already indicated, the effect of these two operational modes is the same. The rate at which water enters the reaction zone increases as the catalyst ages and becomes less active. The concentration of water may also be expressed in terms of the entire reactant stream which is passed through the reaction zone. A water injection rate of 20 wt. ppm. based on the fresh feed is equivalent to about 2000 wt. ppm. based on the combined reactor feed when there is about a 10:1 recycle gas ratio. Using the latter basis, it is preferred that the dehydrogenation of the $C_5$–$C_{18}$ normal paraffins is performed with an initial water concentration, based on the entire reactant stream, of about 1600 to 3000 wt. ppm. During the run, the water concentration is increased to from 2300 to 4350 wt. ppm. This increase should not be fully completed until after at least 40 wt.% of the paraffins which may be dehydrogenated with the individual catalyst loading have passed through the reaction zone.

The particular dehydrogenation conditions employed within the reaction zone may vary depending on such factors as catalyst activity, feedstock composition and the desired conversion. The reaction zone conditions normally employed for the dehydrogenation of normal paraffins include a temperature of from about 430°C. to 540°C., a pressure of from 0.7 to about 13 atmospheres of pressure and a liquid hourly space velocity of about 12 to 34. The preferred operating temperature will be within the range of from about 460°C. to 485°C., and the preferred operating pressure is about 2.0 atmospheres.

I claim as my invention:

1. A process for the dehydrogenation of normal paraffins which comprises the steps of:
   a. injecting 5 to 25 wt. ppm. of water, based on the fresh hydrocarbon feed rate, into a hydrocarbon feed stream comprising normal paraffins having 5 to 18 carbon atoms per molecule;
   b. passing the hydrocarbon feed stream in admixture with a gaseous recycle stream through a reaction zone maintained at dehydrogenation conditions and containing a dehydrogenation catalyst comprising a platinum component and an alkali or alkaline earth component supported on a porous alumina carrier material, and,
   c. increasing the rate of water injection into the fresh hydrocarbon feed stream to a value of 25 to 125 wt. ppm. after at least 40% of the normal paraffins which may be processed before the catalyst requires replacement have passed through the reaction zone.

2. The process of claim 1 further characterized in that the dehydrogenation catalyst comprises a germanium component and the alkali or alkaline earth component is a compound of lithium.

3. A process for the dehydrogenation of normal paraffins which comprises the steps of:
   a. passing a vaporized reactant stream comprising normal paraffins having 5 to 18 carbon atoms per molecule and 1600 to 3000 wt. ppm. of water, based on the entire reactant stream, through a reaction zone maintained at dehydrogenation conditions and containing a dehydrogenation catalyst comprising a platinum component and an alkali or alkaline earth component supported on a porous alumina carrier material; and,
   b. increasing the concentration of water in the reactant stream passed through the reaction zone to 2300 to 4300 wt. ppm. after at least 40% of the normal paraffins which may be processed before the catalyst requires replacement have passed through the reaction zone.

4. The process of claim 3 further characterized in that the dehydrogenation catalyst comprises a germanium component.

5. The process of claim 4 further characterized in that the alkali or alkaline earth component is a compound of lithium.

6. A process for the dehydrogenation of hydrocarbons which comprises the steps of:
   a. mixing a hereinafter described gaseous recycle stream with a stream of hydrocarbons to be dehydrogenated to form a reactant stream comprising the hydrocarbons to be dehydrogenated and water, and passing the reactant stream through a reaction zone containing a dehydrogenation catalyst maintained at dehydrogenation conditions which include an initial temperature required to effect a first preselected conversion per pass through the reaction zone;
   b. passing a reaction zone effluent stream comprising dehydrogenated and undehydrogenated hydrocarbons, water and hydrogen into a separation zone to effect the production of a gaseous recycle stream comprising hydrogen and from 3.5 to 5.5 milligrams of water per liter of the gaseous recycle stream;
   c. increasing the concentration of water in the gaseous recycle stream to 4.5 to 6.5 milligrams per liter after the temperature required to maintain a second preselected conversion per pass in the reaction zone exceeds the initial temperature by 5°C. and,
   d. increasing the concentration of water in the gaseous recycle stream to 5.0 to 7.0 milligrams per liter after the temperature required to maintain a third preselected conversion per pass exceeds the initial temperature by 10°C.

7. The process of claim 6 further characterized in that the concentration of water in the gaseous recycle stream is increased to 5.5 to 7.5 milligrams per liter after the temperature required to maintain a fourth preselected conversion per pass exceeds the initial temperature by 15°C.

8. The process of claim 6 further characterized in that the hydrocarbons to be dehydrogenated are essentially comprised of normal paraffins having 5 to 18 carbon atoms per molecule.

9. The process of claim 6 further characterized in that the dehydrogenation catalyst comprises a platinum component and an alkali or alkaline earth component supported on a porous alumina carrier.

10. The process of claim 9 further characterized in that the dehydrogenation catalyst comprises a germanium component.

11. The process of claim 10 further characterized in that the alkali or alkaline earth component of the dehydrogenation catalyst is a compound of lithium, and that the dehydrogenation catalyst contains on an elemental basis 0.05 to 1.0 wt.% platinum, 0.05 to 2.0 wt.% germanium and 0.25 to 3.5 wt.% lithium.

12. The process of claim 11 further characterized in that the initial temperature is from 460°C. to 480°C.

* * * * *